United States Patent
Eckhart et al.

(10) Patent No.: US 7,389,496 B2
(45) Date of Patent: *Jun. 17, 2008

(54) CONDITION MANAGEMENT SYSTEM AND A METHOD OF OPERATION THEREOF

(75) Inventors: Jason Eckhart, Northampton, PA (US); Michael A. Holmes, Chatham, NJ (US); Chang Li, Center Valley, PA (US); Gerald S. Williams, Macungie, PA (US)

(73) Assignee: Agere Systems Inc., Allentown, PA (US)

( * ) Notice: Subject to any disclaimer, the term of this patent is extended or adjusted under 35 U.S.C. 154(b) by 908 days.

This patent is subject to a terminal disclaimer.

(21) Appl. No.: 10/612,097

(22) Filed: Jul. 2, 2003

(65) Prior Publication Data

US 2005/0005089 A1   Jan. 6, 2005

(51) Int. Cl.
*G06F 9/44* (2006.01)
*G06F 13/24* (2006.01)

(52) U.S. Cl. .................. 717/127; 710/260; 712/244
(58) Field of Classification Search ............. 717/116, 717/127
See application file for complete search history.

(56) References Cited

U.S. PATENT DOCUMENTS

| | | | |
|---|---|---|---|
| 5,371,742 A * | 12/1994 | Brown et al. | 714/2 |
| 5,495,615 A * | 2/1996 | Nizar et al. | 710/260 |
| 5,530,874 A * | 6/1996 | Emery et al. | 710/262 |
| 5,535,420 A * | 7/1996 | Kardach et al. | 710/48 |
| 5,568,644 A * | 10/1996 | Nelson et al. | 710/268 |
| 5,903,894 A * | 5/1999 | Reneris | 707/100 |
| 5,995,736 A * | 11/1999 | Aleksic et al. | 716/18 |
| 6,070,219 A * | 5/2000 | McAlpine et al. | 710/263 |
| 6,119,194 A * | 9/2000 | Miranda et al. | 710/306 |
| 6,253,370 B1 * | 6/2001 | Abadi et al. | 717/154 |
| 6,292,855 B1 * | 9/2001 | Johnson et al. | 710/33 |
| 6,584,532 B1 * | 6/2003 | Francis et al. | 710/264 |
| 6,615,342 B1 * | 9/2003 | Bopardikar et al. | 712/227 |
| 6,704,823 B1 * | 3/2004 | Perez et al. | 710/260 |
| 6,883,053 B2 * | 4/2005 | Shinagawa et al. | 710/263 |
| 2002/0112180 A1 * | 8/2002 | Land et al. | 713/200 |

OTHER PUBLICATIONS

Silberschatz and Galvin, "Operating System Concepts", Dec. 1997, Addison-Wesley, 5th Edition, ISBN 0-201-59113-8, Chapter 8.*

* cited by examiner

*Primary Examiner*—Tuan Q. Dam
*Assistant Examiner*—J. Derek Rutten

(57) ABSTRACT

For use with a processor employing a hierarchical register consolidation structure (HRCS), a condition management system and method of operation thereof. In one embodiment, the system includes a condition management structure (CMS) that abstracts groups of status indicators associated with the HRCS into a tree of hierarchical container objects and element objects. Each of the container objects is associated with at least one of the element objects and linked to a single parent object, and each of the element objects configured to represent at least one of the status indicators and linked to a single child object. The system further includes an abstraction retrieval subsystem that employs the CMS to traverse the HRCS to determine a condition of at least one of the status indicators, and an abstraction management subsystem that employs the CMS to control a propagation of selected ones of the status indicators through the HRCS.

41 Claims, 7 Drawing Sheets

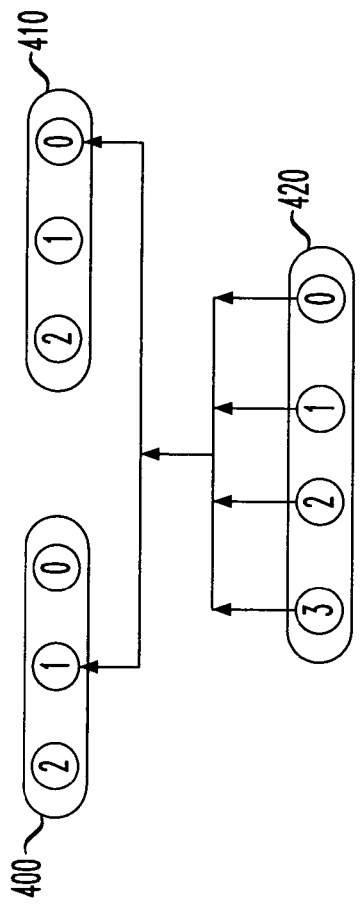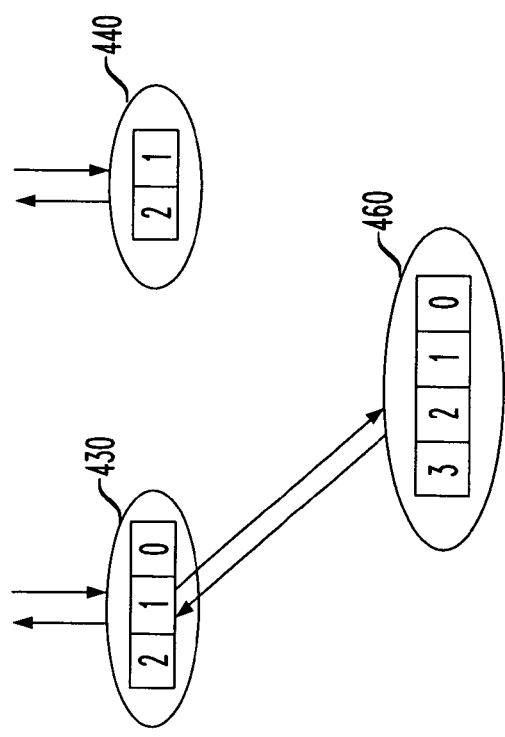
FIG. 4A
FIG. 4B

US 7,389,496 B2

CONDITION MANAGEMENT SYSTEM AND A METHOD OF OPERATION THEREOF

TECHNICAL FIELD OF THE INVENTION

The present invention is directed, in general, to processors and, more specifically, to a condition management system for use with processors and a method of operation of a condition management system.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND OF THE INVENTION

Microprocessors are designed to handle events, such as communication line status and errors, through the use of interrupts. Typically, when a microprocessor receives an event, hardware in the microprocessor sets a bit in an alarm register associated with that particular event. For each bit in the alarm register there is also a corresponding bit in an interrupt mask register that determines if that bit in the alarm register will contribute to or cause the microprocessor to be interrupted. If the bit in the alarm register for that event is allowed to cause an interrupt (not masked), then the microprocessor will be interrupted.

Once the microprocessor is interrupted, the software that processes the interrupts has to determine the cause of the interrupt and inform high-level application software. For example, the interrupt software may have to look at every alarm register and its associated interrupt mask register to determine if a bit within that particular alarm register caused the interrupt. Once the bit causing the interrupt is determined, the interrupt software would have to determine which high-level application software is associated with processing that type of interrupt and then notify that particular high-level application software. However, if the cause of the interrupt is not determined and passed off to the application software within a certain period of time, the event that caused of the interrupt may be lost or the microprocessor might incur unacceptable delays in processing.

As microprocessors have become more specialized and/or capable of monitoring and controlling more devices, the number of interrupts has also increased. However, a simple alarm register and an interrupt mask register structure could not accommodate all of the interrupts needed. In response, system designers developed interrupt register structures that allowed multiple interrupt bits (e.g., bits in the alarm register) to be combined into a single bit in another register. For example, one alarm register containing 16 bits could be combined into a single bit in another alarm register and so one.

These new interrupt register structures, however, are not without problems. Once such problem is the ability of the interrupt software to traverse through the interrupt register structure to determine what caused the interrupt. Also, for each interrupt structure, software engineers would have to develop special code just to traverse that particular structure. The software engineers would also have to develop specialized software applications to handle the interrupts for that interrupt register structure. This would cause the source code to become huge and unmanageable. Also, with the increased code size, the source code can become error prone and validation of both the hardware and software becomes an issue. In addition, as the number of hardware interrupts increases, the ability of the software to detect and handle the increased number of interrupts becomes more difficult.

Accordingly, what is needed in the art is a way to overcome the deficiencies of the prior art in handling complex interrupt structures.

SUMMARY OF THE INVENTION

To address the above-discussed deficiencies of the prior art, the present invention provides, for use with a processor employing a hierarchical register consolidation structure, a condition management system, a method of operation and a memory having a stored condition management data structure. In one embodiment, the condition management system includes a condition management structure configured to abstract groups of status indicators associated with the hierarchical register consolidation structure into a tree of hierarchical container objects and element objects. Each of the container objects is associated with at least one of the element objects and linked to a single parent object. Each of the element objects is configured to represent at least one of the status indicators and linked to a single child object. The condition management system further includes an abstraction retrieval subsystem configured to employ the condition management structure to traverse the hierarchical register consolidation structure to determine a condition of at least one of the status indicators. The condition management system still further includes an abstraction management subsystem configured to employ the condition management structure to control a propagation of selected ones of the status indicators through the hierarchical register consolidation structure.

For purposes of the present invention, the phrase "configured to" means that the device, the system or the subsystem includes the necessary software, hardware, firmware, microcode or a combination thereof to accomplish the stated task. The term "processor" means any type of processing device or system capable of executing software, firmware, microcode or a combination thereof. A processor may include a general purpose computing system, a special purpose processor, an embedded processor, an Application Specific Integrated Circuit ("ASIC") and a microprocessor.

The present invention introduces the broad concept of abstracting a hierarchical register consolidation structure. This advantageously allows for a simplified interface for traversing and controlling information in the hierarchical register consolidation structure, and for reducing development and maintenance effort for device drivers and application software. The condition management system may also be employed in device interrupt validation and control.

The present invention also provides, in another embodiment, a method of operating a condition management system for use with a processor employing a hierarchical register consolidation structure. The method includes employing a condition management structure to abstract groups of status indicators associated with the hierarchical register consolidation structure into a tree of hierarchical container objects and element objects, each of the container objects associated with at least one of the element objects and linked to a single parent object, each of the element objects configured to represent at least one of the status indicators and linked to a single child object. The method further includes employing the condition management structure to traverse the hierarchical register consolidation structure to determine a condition of at least one of the status indicators, and employing the condition management structure to control a propagation of selected ones of the status indicators through the hierarchical register consolidation structure.

In another embodiment, the present invention also provides a memory for storing data for access by an application program being executed in a processor. The memory includes a condition management data structure stored in the memory, the condition management data structure including information to abstract groups of status indicators associated with a hierarchical register consolidation structure of the processor into a tree and accessed by the application program. The condition management data structure including: (1) hierarchical container objects and element objects stored in the memory, each of the container objects being associated with at least one of the element objects and having a parent link to a single parent object, (2) each of the element objects representing at least one of the status indicators and having a child link to a single child object, and (3) the parent object being a consolidation element object associated with a hierarchically higher container object and the child object being a hierarchically lower container object, thereby establishing a hierarchy of the container objects. For purposes of the present invention, "memory" means any type of hardware associable with a processor that is capable of storing information, such as random access memory, memory cells, memory arrays, or circuitry of an ASIC configured to be or perform as some type of memory.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which:

FIG. 4A illustrates a diagram of a portion of a hierarchical register consolidation structure having a single source register propagating to multiple destination bits;

FIG. 4B illustrates a diagram of a portion of an embodiment of a condition management structure configured to accommodate the hierarchical register consolidation structure of FIG. 4A and constructed according to the principles of the present invention;

DETAILED DESCRIPTION

Figure 1:
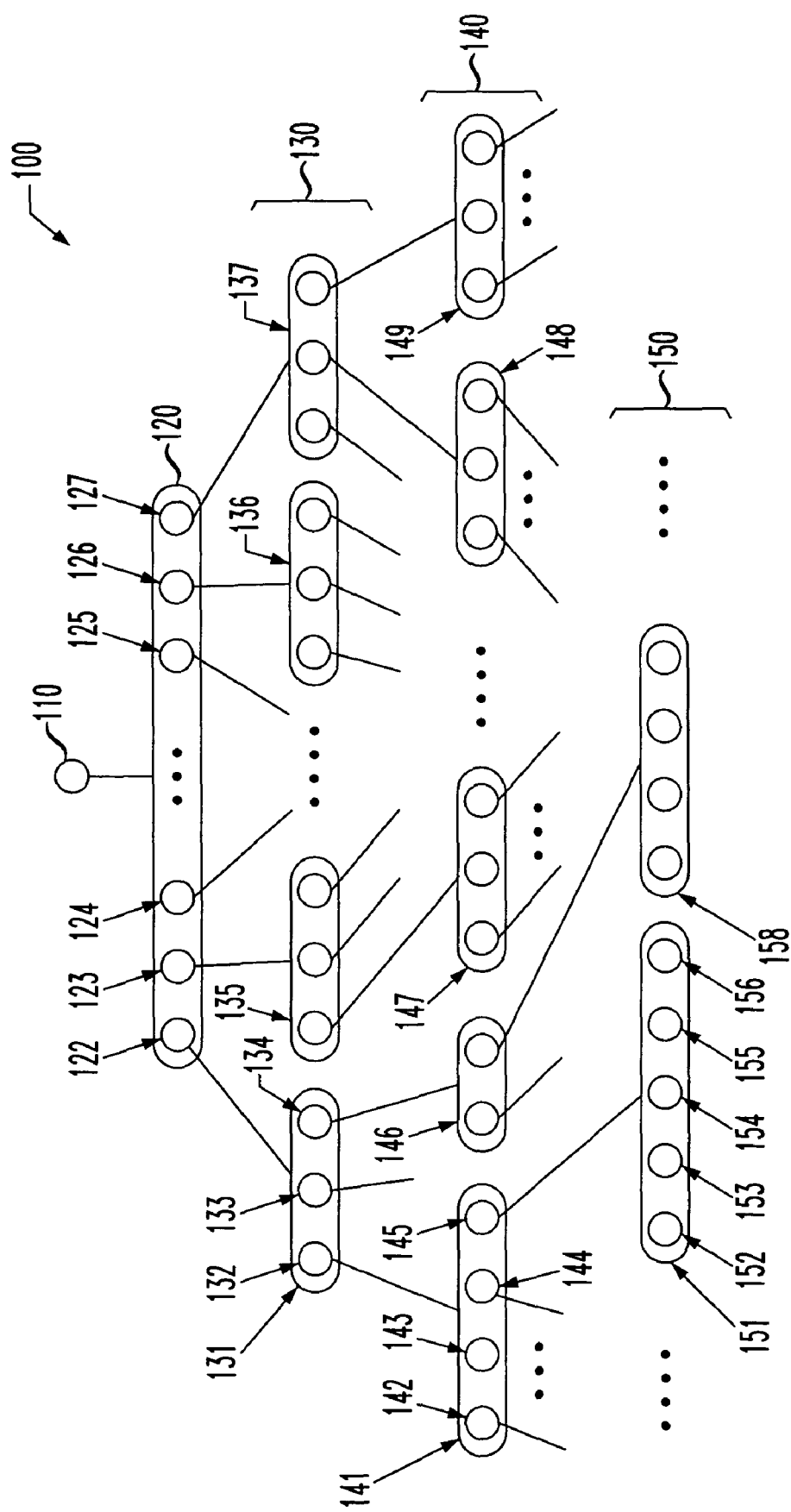
FIG. 1 illustrates a diagram of an example of a hierarchical register consolidation structure of a processor.

Referring initially to FIG. 1, illustrated is a diagram of an example of a hierarchical register consolidation structure, generally designated 100, of a processor that may be employed by the present invention. The hierarchical register consolidation structure 100 has a structure similar to a tree structure having branches and leaves. The lowest level of registers (leaves) in the hierarchical register consolidation structure 100 is source level interrupts 150. Typically, the source level interrupts 150 handle all of the alarms or events associated with the physical circuitry of or connected to the processor. The source level interrupts 150 include a plurality of alarm registers 151, 158. The alarm registers 151, 158 are typically of a "write-1-clear" type of register having bits 152-156 for each alarm (or event) associated with that particular alarm register. A "write-1-clear" type of register latches each of the alarm bits, such as alarm bits 152-156, until cleared. Also, one skilled in the pertinent art should know that the alarm registers 151, 158 may have any number of alarm bits and the hierarchical register consolidation structure 100 may have any number of alarm registers.

Associated with each of the alarm registers 151, 158 are interrupt mask registers (not shown) that contain corresponding interrupt mask bits for each of the alarm bits (152-156) in the alarm registers 151, 158. An interrupt mask bit determines if its corresponding alarm bit can contribute to an interrupt. For example, if the alarm bit 154 of alarm register 151 is set (or in alarm condition) and if the interrupt mask bit that corresponds to alarm bit 154 is disabled (not masked), then the alarm bit 154 would contribute to causing an interrupt. One skilled in the art is familiar with interrupt mask registers and interrupt mask bits.

The next lowest level of registers (nodes) in the hierarchical register consolidation structure 100 is function/channel level interrupts 140. Typically, the function/channel level interrupts 140 are used to indicate the alarms or events on a function and/or channel basis. More specifically, the function/channel level interrupts 140 consolidate the source level interrupts 150 into interrupt status registers 141, 146, 147, 148, 149. Each of the interrupt status registers 141, 146, 147, 148, 149 is of a "read only" type of register and contains interrupt status bits that are a consolidation of the alarm bits within a particular alarm register. For example, if any of the alarm bits 152-156 of the alarm register 151 are in alarm condition and their associated interrupt mask bit is disabled, then those alarm bits are consolidated into (or propagates to) an interrupt status bit 145 of the interrupt status register 141, which causes the interrupt status bit 145 to be set. In the illustrated embodiment, the interrupt status registers 141, 146, 147, 148, 149 may contain any number of interrupt status bits and can be grouped in any manner required. In addition, each of the interrupt status registers 141, 146, 147, 148, 149 has an associated interrupt mask register (not shown) that is used to prevent (mask) or allow their associated interrupt status bits to contribute to causing an interrupt.

The next higher level of registers in the hierarchical register consolidation structure 100 is block level interrupts 130, which are typically used to indicate the alarms or events on a block level basis. The block level interrupts 130 consolidate the function/channel level interrupts 140 into interrupt status registers 131, 135, 136, 137. More specifically, each of the interrupt status registers 131, 135, 136, 137 of the block level interrupts 130 contains interrupt status bits that are a consolidation of the interrupt status registers 141, 146, 147, 148, 149 of the function/channel level interrupts 140. For example, if any of the interrupt status bits 142-145 of the interrupt status register 141 are in alarm condition (set) and their associated interrupt mask bit is disabled, then those interrupt status bits are consolidated into (or propagates to) an interrupt status bit 132 of the interrupt status register 131, which causes the interrupt status bit 132 to be set. In addition, each of the interrupt status registers 131, 135, 136, 137 has an associated interrupt mask register (not shown) that is used to prevent (mask) or allow their associated interrupt status bits to contribute to causing an interrupt.

In the illustrated embodiment, the top level register (root) in the hierarchical register consolidation structure 100 is a chip level interrupt register 120. The chip level interrupt register 120 is similar to an interrupt status register and contains interrupt status bits 122-127. Each of the interrupt status bits 122-127 is a consolidation of their associated interrupt status registers 131, 135, 136, 137 of the block level interrupts 130. For example, if any of the interrupt status bits 132-134 of the interrupt status register 131 are in alarm condition (set) and their associated interrupt mask bit is disabled, then those interrupt status bits are consolidated into the interrupt status bit 122.

The chip level interrupt register 120 also has an associated interrupt mask register (not shown) that individually determines if the interrupt status bits 122-127 may contribute to an interrupt. If any of the interrupt status bits 122-127 are in the alarm condition and their associated interrupt mask bit is disabled, then an interrupt will be asserted on the interrupt pin 110. If an interrupt is asserted on the interrupt pin 110, the processor employing the hierarchical register consolidation structure 100 will be interrupted. One skilled in the art should know that the hierarchical register consolidation structure 100 may have any number of layers and may have any number of interrupt status registers or alarm registers in their appropriate layers having any number of bits. Also, the associated functionality of each layer of the hierarchical register consolidation structure 100 may be different depending upon the implementation. In other embodiments, other types of registers may be employed in place of the alarm registers described above.

Figure 2:
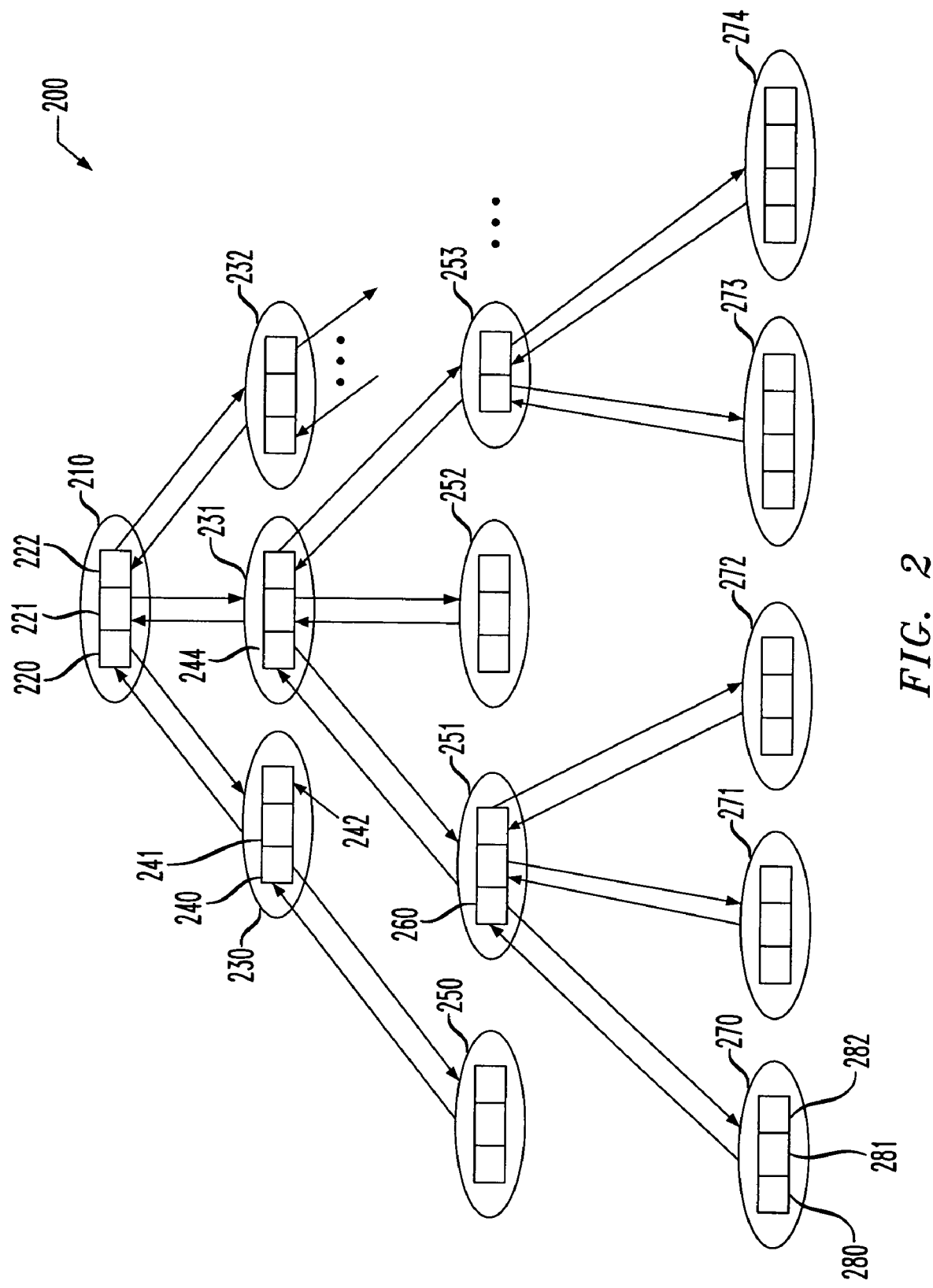
FIG. 2 illustrates a diagram of an embodiment of a condition management structure constructed according to the principles of the present invention.

Turning now to FIG. 2, illustrated is a diagram of an embodiment of a condition management structure, generally designated 200, constructed according to the principles of the present invention. The condition management structure 200 is a data structure that is stored in memory associated with a processor and can be accessed by an application program being executed by the processor. The condition management structure 200 advantageously includes information to abstract groups of status indicators associated with a hierarchical register consolidation structure of the processor into a tree. See FIG. 1 for a description of a hierarchical register consolidation structure.

The structure of the condition management structure 200 includes two types objects: container objects and element objects. Each of the container objects is associated with at least one element object and includes a parent link to a single parent object. Each of the element objects represents at least one of the status indicators in the hierarchical register consolidation structure. Also, each of the element objects includes a child link to a single child object. In a related embodiment, the container objects may include the element objects. In addition, the container objects and element objects, in one embodiment, may be stored in heap memory. See Table 1-A for an example of code of the container object and element object that may be used with heap memory. In a related embodiment, the container objects are stored in heap memory and the element objects associated with a particular container object are stored contiguously in heap memory. See Table 1-B for an example of code of the container object and element object for this type. In another embodiment, the container objects and element objects may be stored in an array of container objects and an array of element objects, respectively. In a related embodiment, the array of container objects and the array element objects employ contiguous memory locations. See Table 2 for an example of code of the container object and element object that may be used with arrays. One skilled in the pertinent art is familiar with heap memory and arrays stored in memory. Of course, however, the present invention is not limited to the structures illustrated by the examples of code. Other embodiments of the present invention may have additional elements within each structure or may employ different techniques for linking the structures and still be within the scope of the present invention.

TABLE 1-A

```
// CONTAINER OBJECT structure
struct Node{
    struct Elem* parent;    /* Pointer to Parent Element */
    struct Elem* member;    /* Pointer to 1st Element */
    int sAddr;              /* Status Address */
    int mAddr;              /* Mask Address */
    int pAddr;              /* Persistency Address */
    int aAddr;              /* Alarm Address */
    NodeName name;          /* Name of Container */
};
// ELEMENT OBJECT structure
struct Elem
{
    Node* child;            /* Pointer to Child Container */
    Node* container;        /* Pointer to My Container */
    Elem* nextMember;       /* Pointer to next Element */
    int pos;                /* Bit position of element */
    ElemName name;          /* Name of Element */
};
// CONDITION MANAGEMENT STRUCTURE
struct Tree
{
    Node* root;             /* Pointer to root of the tree */
};
```

TABLE 1-B

```
// CONTAINER OBJECT structure
struct Node{
    struct Elem* parent;       /* Pointer to Parent Element */
    struct Elem* member;       /* Pointer to 1st Element */
    int numOfMember;           /* Number of Elements */
    int sAddr;                 /* Status Address */
    int mAddr;                 /* Mask Address */
    int pAddr;                 /* Persistency Address */
    int aAddr;                 /* Alarm Address */
    NodeName name;             /* Name of Container */
};
// ELEMENT OBJECT structure
struct Elem
{
    Node* child;               /* Pointer to Child Container */
    Node* container;           /* Pointer to My Container */
    int pos;                   /* Bit position of element */
    ElemName name;             /* Name of Element */
};
// CONDITION MANAGEMENT STRUCTURE
struct Tree
{
    Node* root;                /* Pointer to root of the tree */
};
```

TABLE 2

```
// CONTAINER OBJECT structure
typedef struct NODE{
    dmU16 parentOffset;        /* offset to parent element */
    dmU16 memberOffset;        /* offset to 1st element */
    dmU8 numOfMember;          /* number of elements */
    dmU16 sAddr;               /* status address */
    dmU16 mAddr;               /* mask address */
    dmU16 pAddr;               /* persistency address */
    dmU16 aAddr;               /* alarm address */
    tsGID_e name;              /* name of container */
} Node;
// ELEMENT OBJECT structure
typedef struct ELEM{
    dmU16 childOffset;         /* offset to child container */
    dmU16 containerOffset;     /* offset to my container */
    dmU8 pos;                  /* bit position of element in group */
    tsEID_e name;              /* name of element */
}Elem;
// CONDITION MANAGEMENT STRUCTURE
typedef struct TREE{
    Node *root;                /* pointer to root of the tree */
    Node *nodebase;            /* pointer to container array */
    Elem *elementbase;         /* pointer to element array */
}Tree;
```

To simplify the discussion, the condition management structure 200 is illustrated as and will be discussed in a simpler form. Accordingly, unless specifically indicated herein, the arrangement, linking and number of container objects and element objects illustrated are not limitations of the present invention.

The condition management structure 200 is similar to a tree structure, in that, the condition management structure 200 includes leaves, branches and a single root. The leaves of the condition management structure 200 are container objects 270-274. Each of the leaf container objects 270-274 may be associated with any number of element objects. For example, leaf container 270 is associated with three element objects 280-282. Typically, the leaf container objects 270-274 are associated with the lowest level of registers, which contain a group of status indicators, in a hierarchical register consolidation structure, such as the alarm registers 151, 158 of the source level interrupts 150 of FIG. 1. Also, each of the element objects 280-282 represents at least one status indicator within the lowest level of registers in the hierarchical register consolidation structure. For example, the element objects 280-282 may represent the alarm bits 152-154 of alarm register 151 of FIG. 1. Also, each of the element objects associated with the leaf container objects 270-274, such as element objects 280-282, has their child link to a child object unestablished (or set to NULL). One skilled in the pertinent art should know that the element objects employed in the present invention are not limited to representing alarm bits or interrupt bits. In other embodiments, element objects may represent any type of status indicators or bits of registers in a hierarchical register consolidation structure.

The element objects, such as element objects 280-282, may also include a unique name and a position of the status indicator(s) within a register of the hierarchical register consolidation structure. This allows the application software to be able to locate the appropriate status indicator(s) and return its current state and unique name. The application software may also be able to perform functions to the condition management structure 200 and/or its associated hierarchical register consolidation structure based on the unique name. In addition, each of the element objects may also include a container link to its associated container object. For example, each of the element objects 280-282 has a container link to its associated leaf container object 270. This allows for easier traversals up and through the condition management structure 200.

As stated previously, each of the container objects, including the leaf container objects 270-274, has a parent link to a single parent object. In the illustrated embodiment, the parent object is a consolidation element object associated with a hierarchically higher container object. For example, the parent object of the leaf container object 270 is a consolidation element object 260 of a container object 251. The consolidation element object 260 is the same as an element object except that the consolidation element object 260 represents the consolidation of all of the element objects 280-282 of the leaf container object 270. The consolidation of element objects 280-282 to the consolidation element object 260 is similar to the consolidation of the alarm bits 152-156 into the interrupt status bit 145 of FIG. 1. As with an element object, the consolidation element object has a child link to a child object that is a hierarchically lower container object. In FIG. 2, the child object linked to the consolidation element object 260 is the leaf container object 270. This double linking advantageously allows for quick determination of status indicators and traversal up and down the condition management structure 200.

In a related embodiment, each of the container objects, such as the leaf container objects 270-274, includes an address of its associated register in the hierarchical register consolidation structure. The register address may be the alarm register address or a mask register address. The register address may also be a status register address. In yet another embodiment, the register address may be a persistency register address. The application program may employ the register address to quickly access the desired register in the hierarchical register consolidation structure. For example, if the register address is to the mask register associated with the alarm register 151 of FIG. 1, the application program could access the mask register and determine if any of the alarm bits 152-156 of the alarm register 151 could have contributed to an interrupt that occurred.

Traversing up the condition management structure 200, the next higher hierarchical level includes container objects 250-253. Typically, the container objects 250-253 would abstract the groups of status indicators in the next hierarchically higher level of registers of the hierarchical register consolidation structure. For example, the container objects 250-253 may abstract the groups of status indicators in the function/channel level interrupts 140 of FIG. 1. As illustrated in FIG. 2, this level in the condition management structure 200 may have branch container objects 251, 253 and leaf container object 250, 252. Branch container objects, in one embodiment, are associated with elements objects that are consolidation element objects that are linked to single child objects. The child objects are hierarchically lower container objects. For example, the branch container object 251 is associated with an element object 260 that has a child link to the leaf container object 270.

Typically, all leaf container objects are logically located at the lowest level of the condition management structure 200. However, the condition management structure may have leaf container objects at any level, such as leaf container objects 250, 252. The logical location of leaf container objects may depend upon the how the hierarchical register consolidation structure is organized. The logical location of leaf container objects may also depend upon if any of the hierarchically lower groups of status indicators may contribute to or propagate to any higher groups of status indicators. This advantageously allows the condition management structure 200 to be adapted to various types of hierarchical register consolidation structures.

The next hierarchically higher level of the condition management structure 200 includes branch container objects 230-232. Typically, these branch container objects 230-232 would abstract the groups of status indicators in the next hierarchically higher level of registers of the hierarchical register consolidation structure. For example, the branch container objects 230-232 may abstract the groups of status indicators in the block level interrupts 130 of FIG. 1. In a related embodiment, the branch container object 230 may be associated with a consolidation element object 240 having a child link to the container object 250 and element objects 241, 242 that do not have a child link to a child object established (or set to NULL) similar to the element objects 280, 281 of the leaf container object 270. Usually, all of the element objects associated with a container object either have a child link to a child object or do not have a child link to a child object established. This mixture of element objects allows the condition management structure 200 to be able to abstract various types of hierarchical register consolidation structures and/or have various logical configurations based upon specific requirements.

In FIG. 2, the root of the condition management structure 200 is a root container object 210. Since the root container object 210 is the root of the condition management structure 200, the root container object 210 does not have a parent link to a single parent object established (or set to NULL) and is the starting point for traversing the condition management structure 200. Associated with the root container object 210 are element objects 220-222. Typically, the root container object 210 represents the top level register in a hierarchical register consolidation structure and each of the element objects 220-222 represents a status indicator in the top level register. For example, the root container object 210 may represent the chip level interrupt register 120 of FIG. 1 and the element objects 220-222 may represent the single interrupt status bits 122-124, respectively, of the chip level interrupt register 120. The element objects 220-222 are also consolidation element objects for the container objects 230-232, respectively.

One skilled in the pertinent art should know that the present invention is not limited to the condition management structure 200 as illustrated in FIG. 2. Nor is the present invention limited to two to four element objects being associated with a particular container object. In other embodiments of the present invention, the condition management structure may have any number of element objects associated with a container object, and there may be any number of logical levels having any number of container objects associated with each logical level.

Figure 3A:
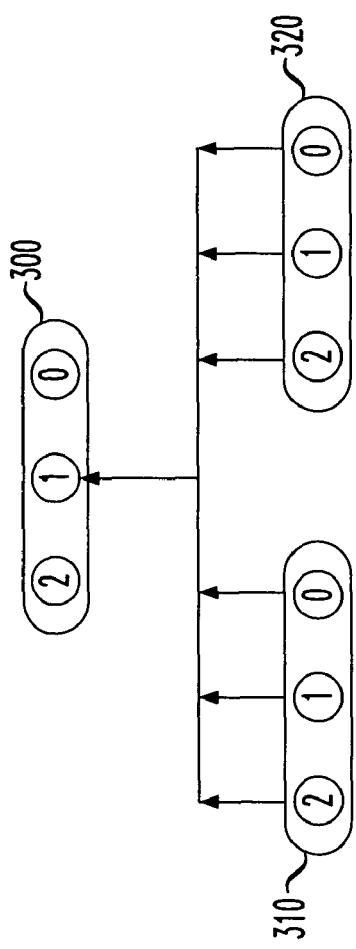
FIG. 3A illustrates a diagram of a portion of a hierarchical register consolidation structure having multiple source registers propagating to a single destination bit.

Turning now to FIG. 3A, illustrated is a diagram of a portion of a hierarchical register consolidation structure having multiple source registers 310, 320 propagating to a single destination bit. In the example illustrated in FIG. 3A, each of the source registers 310, 320 has three status indicators (or bits) 0, 1, 2. The status indicators 0, 1, 2 of both of the source registers 310, 320 propagate (consolidate) to a single destination bit (or consolidation status indicator) 1 of a consolidation register 300. For example if any of the status indicators 0, 1, 2 of either of the source registers 310, 320 are set, then the destination bit 1 of the consolidation register 300 will also be set. The problem with this type of hierarchical register consolidation structure illustrated in FIG. 3A is that it is impossible to know just from the destination bit 1 in the consolidation register 300 which of the source registers 310, 320 caused the destination bit 1 to be set. The application program will have to access each of the source registers 310, 320 to determine which of the status indicators caused the destination bit 1 of the consolidation register 300 to be set.

Figure 3B:
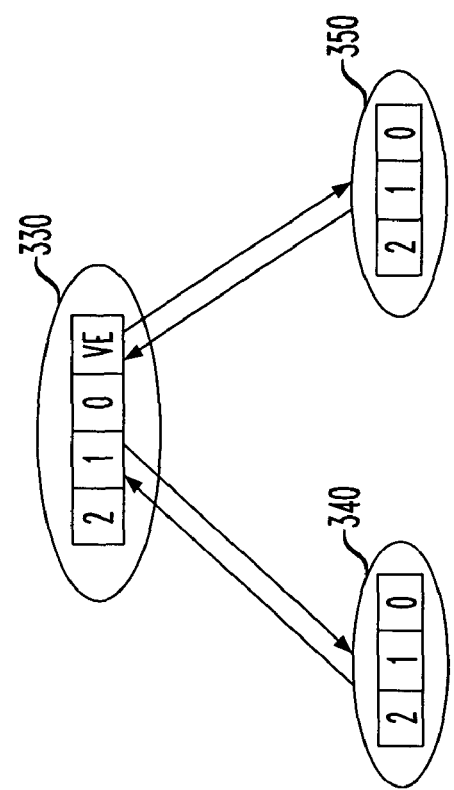
FIG. 3B illustrates a diagram of a portion of an embodiment of a condition management structure employing a virtual element object to accommodate the hierarchical register consolidation structure of FIG. 3A and constructed according to the principles of the present invention.

Turning now to FIG. 3B, illustrated is a diagram of a portion of an embodiment of a condition management structure employing a virtual element object to accommodate the hierarchical register consolidation structure of FIG. 3A and constructed according to the principles of the present invention. In order to abstract the portion of hierarchical register consolidation structure illustrated in FIG. 3A, the condition management structure would include first and second container objects 340, 350. The first and second container objects 340, 350 are associated with element objects that represent the status indicators 0, 1, 2 of the source registers 310, 320. The first container object 340 would have a parent link to an element object 1 associated with a hierarchically higher container object 330 that represents the destination bit 1 of the consolidation register 300. The element object 1 is similar to a consolidation element object and has a child link to the first container object 340. Instead of the second container object 350 having a parent link to the consolidation element object 1 similar to FIG. 3A, the second container object 350 would have its parent link to virtual element object (VE) of the container object 330. The virtual element object VE is also similar to a consolidation element object and has its child link to the second container object 350. The condition management structure employs the virtual element object VE to maintain a one-to-one parent to child relationship. As a result, the condition management structure would have independent paths (links) to each of the first and second container objects 340, 350. In an alternate embodiment, however, the condition management structure may allow a consolidation object to be linked to multiple hierarchically lower container objects depending upon the hierarchical register consolidation structure being modeled.

Turning now to FIG. 4A, illustrated is a diagram of a portion of a hierarchical register consolidation structure having a single source register 420 propagating to multiple destination bits. In this example, the single source register 420 has four status indicators (or bits) 0, 1, 2, 3, which propagate (or consolidate) to a destination bit 1 (or consolidation status indicator) of a first consolidation register 400.

The four status indicators 0, 1, 2, 3 of the source register 420 also consolidate to a consolidation status indicator 0 of a second consolidation register 410. If any of the status indicators 0, 1, 2, 3 of the source register 420 are set, then both the consolidation status indicator 1 of the first consolidation register 400 and the consolidation status indicator 0 of the second consolidation register 410 are also set. The problem with this type of hierarchical register consolidation structure illustrated in FIG. 4A is that the source register 420 has two consolidation paths, which is inefficient when trying to determine and process interrupts.

Turning now to FIG. 4B, illustrated is a diagram of a portion of an embodiment of a condition management structure configured to accommodate the hierarchical register consolidation structure of FIG. 4A and constructed according to the principles of the present invention. The present invention, in one embodiment, solves the inefficiencies of the hierarchical register consolidation structure illustrated in FIG. 4A by removing the second consolidation path. More specifically, the condition management structure includes a container object 460 that is associated with element objects that represent status indicators 0, 1, 2, 3 of the source register 420 of FIG. 4A. The container object 460 would have a parent link to an element object 1 associated with a hierarchically higher container object 430. The element object 1 is similar to a consolidation element object and has a child link to the container object 460.

The condition management structure would also include a container object 440 that is associated with element objects that represent the status indicators 1, 2 of the consolidation register 410. The container object 440 does not include an element object that represents the status indicator 0 of the consolidation register 410 because the consolidation of the source register 420 is represented by the element object 1 associated with the container object 430. The present invention, in an alternate embodiment, could consolidate the element objects associated with the container object 460 to an element object associated with the container object 440 that represents the consolidation status 0 of the consolidation register 410. This would also change the priority of the container object 460 and its associated element objects. The condition management structure typically gives the highest priority to the left side of the structure during searches. The present invention also allows the priority of element objects and their associated container objects to be changed by rearranging the condition management structure. In addition, the condition management structure, such as the one in FIG. 2, may have a different structure than the hierarchical register consolidation structure in order to accommodate different processing requirements.

Figure 5A:
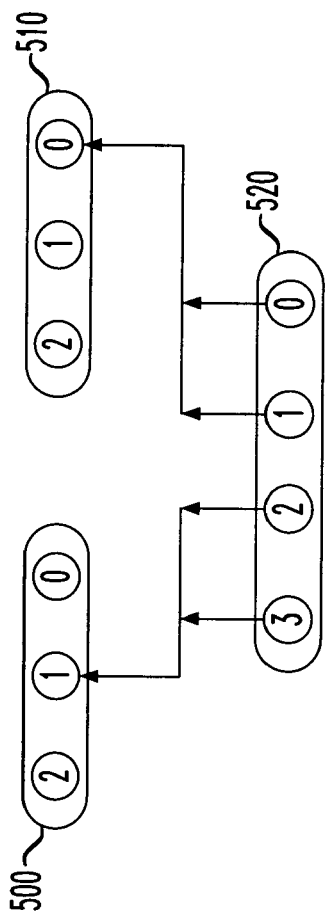
FIG. 5A illustrates a diagram of a portion of a hierarchical register consolidation structure having different bits in a single source register propagating to destination bits in different destination registers.

Turning now to FIG. 5A, illustrated is a diagram of a portion of a hierarchical register consolidation structure having different bits in a single source register 520 propagating to destination bits in different destination registers. In this example, the single source register 520 has four status indicators (or bits) 0, 1, 2, 3. The first two status indicators 3, 2 of the source register 520 propagate (or consolidate) to a destination bit (or consolidation status indicator) 1 of a first consolidation register 500. The second two status indicators 0, 1 of the source register 520 consolidate to a consolidation status indicator 0 of a second consolidation register 510. The problem with this type of hierarchical register consolidation structure illustrated in FIG. 4A is that it would require a container object to have multiple parent objects instead of a single parent object.

Figure 5B:
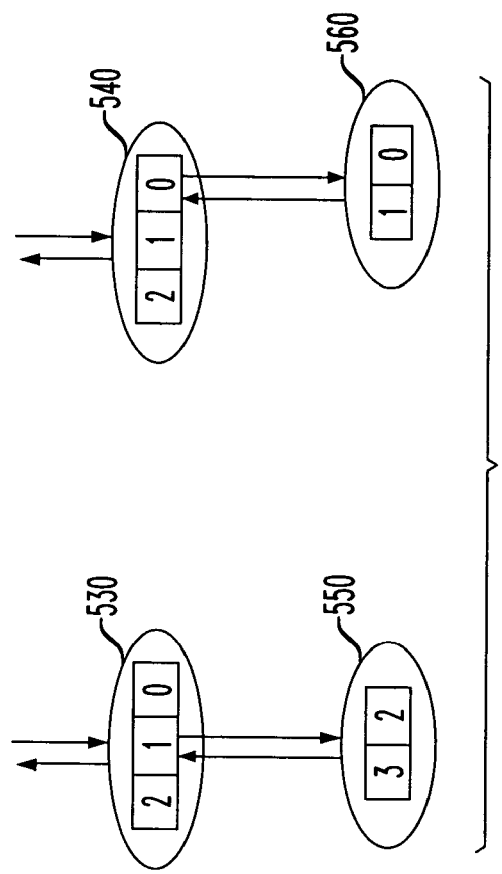
FIG. 5B illustrates a diagram of a portion of an embodiment of a condition management structure employing a virtual container object to accommodate the hierarchical register consolidation structure of FIG. 5A and constructed according to the principles of the present invention.

Turning now to FIG. 5B, illustrated is a diagram of a portion of an embodiment of a condition management structure employing a virtual container object to accommodate the hierarchical register consolidation structure of FIG. 5A and constructed according to the principles of the present invention. More specifically, the condition management structure includes a container object 550 being associated with two element objects that represent the first two status indicators 3, 2 of the source register 520. The container object 550 would also have a parent link to an element object 1 associated with a hierarchically higher container object 530 that represents the consolidation status indicator 1 of the consolidation register 500.

The condition management structure also includes a virtual container object 560 being associated with two element objects that represent the second two status indicators 1, 0 of the source register 520. The virtual container object 560 is similar to a container object and has a parent link to an element object 0 associated with a hierarchically higher container object 540. The element object 0 represents the consolidation status indicator 0 of the consolidation register 510 and has its child link to the virtual container object 560. The virtual container object 560 allows the condition management structure to accommodate the type of hierarchical register consolidation structure of FIG. 5A while maintaining its rule that each container object has a parent link to only a single parent object.

Figure 6:
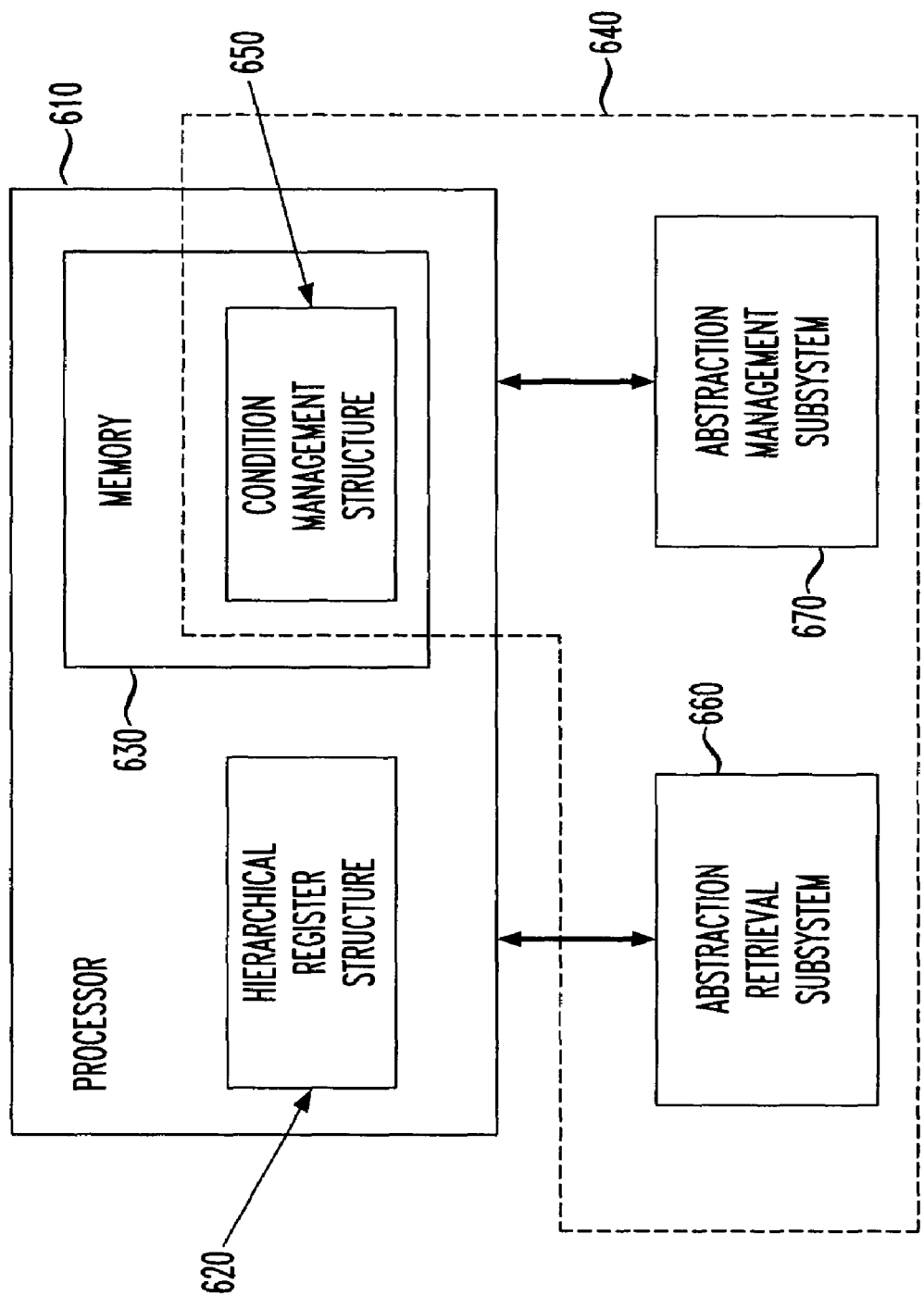
FIG. 6 illustrates a block diagram of an embodiment of a condition management system constructed according to the principles of the present invention.

Turning now to FIG. 6, illustrated is a diagram of an embodiment of a condition management system, generally designated 640, constructed according to the principles of the present invention. The condition management system 640 may be employed with a conventional processor 610 having a hierarchical register consolidation structure 620 and memory 630. The processor 610 may be a microprocessor, an embedded processor, a communications processor, a network processor, such as a Synchronous Optical Network (SONET) processor, a microprocessor within an Application Specific Integrated Circuit (ASIC) or any type of processor having some type of hierarchical register consolidation structure 620. The memory 630, in another embodiment, may include one type of memory located with the processor 610 and another type of memory located external to the processor. The hierarchical register consolidation structure 620, in one embodiment, may be similar to the hierarchical register consolidation structure 100 of FIG. 1. In another embodiment, the hierarchical register consolidation structure 620 may be a hierarchical interrupt register structure of the processor 610.

The condition management system 640, in the illustrated embodiment, includes a condition management structure 650. The condition management structure 650 abstracts groups of status indicators associated with the hierarchical register consolidation structure 620 into a tree of hierarchical container objects and element objects. See FIG. 2 for a more detailed description of a condition management structure, container objects and element objects. The condition management structure 650 may be stored in the memory 630. In another embodiment, the condition management structure 650 may be dynamically allocated. In yet another embodiment, the condition management structure 650 may be pre-allocated within hardware associated with the processor 610. For example, the processor 610 may be part of an ASIC and the condition management structure 650 could be pre-allocated in cells of the ASIC that allow at least part of the condition management structure 650 to be modifiable. In yet another embodiment, the condition management structure 650 may be allocated in static memory or preallocated by means of directives stored in a compiled application program that employs the condition management structure 650. Of course, however, other methods of pre-allocating the condition management structure 650 are well within the scope of the present invention.

The condition management system 640, in one embodiment, also includes an abstraction retrieval subsystem 660 and an abstraction management subsystem 670. The abstraction retrieval subsystem 660 and the abstraction management subsystem 670 may be software, hardware, firmware, microcode or a combination thereof, and may be embodied within the processor 610, external to the processor 610 or a combination thereof. The abstraction retrieval subsystem 660 is configured to employ the condition management structure 650 to traverse the hierarchical register consolidation structure 620 to determine a condition of at least one of the status indicators of the hierarchical register consolidation structure 620. In one embodiment, the status indicators may be a single bit within a register of the hierarchical register consolidation structure 620, such as an alarm bit or an interrupt status bit. In a related embodiment, the abstraction retrieval subsystem 660 may also retrieve a unique name associated with the status indicator.

In one example, the hierarchical register consolidation structure 620 may be a hierarchical interrupt register structure and the abstraction retrieval subsystem 660 may employ the condition management structure 650 to abstract the hierarchical interrupt register structure. Given this, the abstraction retrieval subsystem 660 may recursively traverse the condition management structure 650 to determine which event/interrupt caused an interrupt. For example, if an event/interrupt occurred and the cause of the event/interrupt was an alarm bit represented by the element object 281 of the leaf container object 270 of FIG. 2. The abstraction retrieval subsystem 660, employing the condition management structure, would first access the root container object 210 and determine which of the associated element objects 220-222 were set. In one embodiment, the abstraction retrieval subsystem 660 would determine the appropriate element object by first reading the interrupt status register (not shown) associated with the root container object 210. The abstraction retrieval subsystem 660 would then traverse each of the associated element objects 220-222 and employ the bit position of the element object's interrupt status bit (status indicator) to determine which interrupt status bit is in alarm condition. In this case, the interrupt status bit associated with the second element object 221 is in the alarm condition state.

The abstraction retrieval subsystem 660 may then employ the child link of the second element object 221 to obtain the branch container object 231 and its associated interrupt status register. In the procedure described above, the abstraction retrieval subsystem 660 would determine that the element object 244 is associated with the interrupt status bit that is in the alarm condition at this level. The abstraction retrieval subsystem 660 may then employ the child link of the element object 244 to obtain the branch container object 251 and its associated interrupt status register. The abstraction retrieval subsystem 660 would then determine, from the above procedures, that the element object 260 is associated with the interrupt status bit that is in the alarm condition.

The abstraction retrieval subsystem 660 would then employ the child link of the element object 260 to obtain a leaf container object 270. Since the container object is a leaf container object, the abstraction retrieval subsystem 660 would obtain the associated alarm register (or source register) from the hierarchical interrupt register structure 620.

The abstraction retrieval subsystem 660 may also obtain a mask register associated with the alarm register from the hierarchical interrupt register structure 620. Employing the alarm register and possibly the mask register, the abstraction retrieval subsystem 660 may determine which of the element objects 280-282 is associated with an alarm bit that is in the alarm condition and if the alarm bit may contribute to causing an interrupt. In this example, the element object 281 is associated with an alarm bit that caused the interrupt. See FIGS. 1 and 2 for a discussion on interrupt mask registers and contributing to interrupts (propagation). The abstraction retrieval subsystem 660 would then return information indicating which alarm bit caused the interrupt. The abstraction retrieval subsystem 660 may, in a related embodiment, also return a unique name associated with that particular alarm bit. See Table 3 for exemplary code for recursively traversing the condition management structure 650 to determine the condition of one or more status indicators.

TABLE 3

Example Retrieval Code

```
Elem *getNextActiveElem(Node *upbnd, Elem *lastActiveElem){
    Elem *pElem = NULL;
    if (lastActiveElem == NULL){
        // This is the case which found the first Active Elem
        // under upbnd. Need to make sure the parent of upbnd
        // is Active, otherwise no active
        if (upbnd->parent == NULL){ /* upbnd is the root */
            __getRecActiveElem(upbnd);
        }else if (isElemActive(upbnd->parent) ==true){
            __getRecActiveElem(upbnd);
        }
    }else{
        // First check if lastActiveElem is an offspring of
        // updng, otherwise return error
        pElem = lastActiveElem;
        while((pElem->container != upbnd) &&
                (pElem->container->parent != NULL)){
            pElem = pElem->container->parent;
        }
        if((pElem->container->parent == NULL) &&
            (pElem->container != upbnd)){
            return NULL; //Error
        }
        // Assume the lastActiveElem is an Active one,
        // So the parent of upbnd should be active from
        // hardware
        __getRecNextActiveElem(upbnd, lastActiveElem);
    }
    pElem = ActiveElem;
    ActiveElem = NULL;
    return pElem;
}
void __getRecActiveElem(Node *node){
    Elem *pElem;
    int mVal, aVal, sVal;
    // the following assures one register access for whole
    // node value
    if(node->elem->child == NULL){
        mVal = DEVREAD(node->mAddr);
        aVal = DEVREAD(node->aAddr);
    }else{
        sVal = DEVREAD(node->sAddr);
    }
    for (int i=0; (i<node->numOfMember) && (ActiveElem==NULL);
            i++){
        pElem = &node->member[i];
        // Found the active Elem
        if (pElem->child == NULL){
            if (__getBitVal(aVal, pElem->pos) == true &&
                __getBitVal(mVal, pElem->pos) == true){
                ActiveElem = pElem;
                return;
            }
        }
    }
```

TABLE 3-continued

Example Retrieval Code

```
    // Determine whether to go down further
    if (pElem->child != NULL &&
        _getBitVal(sVal, pElem->pos) == true){
        _getRecActiveElem(pElem->child);
    }
  }
}
void _getRecNextActiveElem(Node *upbnd, Elem *lastActiveElem){
  Elem *pElem;
  Node *pContainer;
  int offset, mVal, aVal, sVal;
  pContainer = lastActiveElem->container;
  offset = lastActiveElem - pContainer->elem;
  // The pointer difference between the specified start with
  // the first elem. Make sure at least the next elem
  // exists. Also there is no active elem children under if
  // the parent is not active
  while(pContainer != upbnd &&
      (offset == (pContainer->numOfMember - 1))){
      lastActiveElem = pContainer->parent;
      pContainer = lastActiveElem->container;
      offset = lastActiveElem - pContainer->elem;
  }
  // if this lastActiveElem is the last one on upbnd,
  // then no active elem found
  if (pContainer == upbnd && offset ==
    (pContainer->numOfMember -1)){
      return;           // no further active elem found,
                        // reach the upbound
  }
  // the following assumes one register access for
  // whole node value
  if(pContainer->elem->child == NULL){
      mVal = DEVREAD(pContainer->mAddr);
      aVal = DEVREAD(pContainer->aAddr);
  }else{
      sVal = DEVREAD(pContainer->sAddr);
  }
  // need to check ActiveElem here
  for (int i=offset + 1; (i<pContainer->numOfMember)&&
      (ActiveElem==NULL); i++){
      pElem = &pContainer->member[i];
      if (pElem->child == NULL){
        // Found the active Elem
        if (_getBitVal(aVal, pElem->pos) == true &&
            _getBitVal(mVal, pElem->pos) == true){
            ActiveElem = pElem;
            return;
        }
      }
      // Determine whether to go down further
      if (pElem->child != NULL &&
          _getBitVal(sVal, pElem->pos) == true){
          _getRecActiveElem(pElem->child);
      }
  }
  if (ActiveElem == NULL){
      //Active elem not found under this level
      if (pContainer == upbnd ){
          // if this happened in the upbnd node
          return;
          // no further active elem found, reach the bound
      }else{ // go up one level, keep looking
          lastActiveElem = pContainer->parent;
          _getRecNextActiveElem(upbnd, lastActiveElem);
      }
  }
}
```

The exemplary code illustrated in Table 3 is based on the container object and element object structures illustrated by the code in Table 1-B. In another embodiment, the above example code could be modified to use the container object and element object structures illustrated by the code in Tables 1-A or Table 2.

Referring back to FIG. 6, the abstraction retrieval subsystem 660, in one embodiment, is further configured to employ a mask to determine the condition of one or more status indicators that are represented by ones of the element objects associated with a leaf container object. See FIG. 2 for a more detailed description of leaf container objects and element objects of a condition management structure. In a related embodiment, the abstraction retrieval subsystem 660 may be further configured to employ a mask to traverse the condition management structure 650 and determine the condition of one or more of the status indicators in the hierarchical register consolidation structure 620.

In the illustrated embodiment, the condition management system 640 also includes the abstraction management subsystem 670. The abstraction management subsystem 670 is configured to employ the condition management structure 650 to control a propagation of one or more of the status indicators through the hierarchical register consolidation structure. The abstraction management subsystem 670, in one embodiment, may control propagation by setting/clearing or enabling/disabling interrupts for the status indicators abstracted by the condition management structure 650 if the hierarchical register consolidation structure 620 is a hierarchical interrupt register structure. See Table 4 for exemplary code for enabling and disabling interrupts for status indicators.

TABLE 4

Enabling and Disabling Elements and Nodes

```
// A set of configuration functions
void enableElem(Elem *elem){
int addr, pos, val;
    while(elem->container->parent != NULL)
    {
        addr = elem->container->mAddr;
        pos = elem->pos;
        val = DEVREAD(addr);
        DEVWRITE(addr, (val|(1<<pos))); // "1" as unmask
        elem = elem->container->parent;
    };
}
void enableNode(Node *node, int selectbits){
    // First enable the whole node with only unmask the
    // interested bits
    DEVWRITE(node->mAddr,(DEVREAD(node->mAddr)|
        (selectbits&_getNodeBitMask(node))));
    // Upward the chain to reach the root
    if(node->parent->container->parent != NULL){
        enableElem(node->parent);
    }
}
void disableElem(Elem *elem){
    int addr, pos, val;
    if (elem->container->parent == NULL)
    {
        // Since there is no mask at TFEC root level,
        // mask its children
        _disableRecNode(elem->child);
    }else{
        addr = elem->container->mAddr;
        pos = elem->pos;
        val = DEVREAD(addr);
        DEVWRITE(addr, val&~(1<<pos));
#if MASK_CHILDREN
        if (elem->child != NULL){
            _disableRecNode(elem->child);
        }
#endif
    }
}
void disableNode(Node *node, int selectbits){
    int i, mVal;
    Elem *pElem;
```

TABLE 4-continued

Enabling and Disabling Elements and Nodes

```
            if (node->parent == NULL)
            {
                // Since there is no mask at TFEC root level,
                // mask its children
                if (node->member->child != NULL){
                // this is based on assumption that there is no
                // hybrid nodes
                    for (int i=0; i<node->numOfMember; i++)
                    {
                        pElem = &node->member[i];
                        if((selectbits & (1<<pElem->pos)) != 0){
                            //get down to the leaf nodes
                            _disableRecNode(pElem->child);
                        }
                    }
                }
            }else{
                // disable only the interested bits
                // "0" as mask
                mVal = DEVREAD(node->mAddr);
                DEVWRITE(node->mAddr, mVal&( ~(selectbits &
                _getNodeBitMask(node)) ) );
                // implementaion depending search type
#if MASK_CHILDREN
                if (node->member->child != NULL)
                    { // this is based on assumption that there is no
                    // hybrid nodes
                        for (i=0; i<node->numOfMember; i++)
                        {
                            pElem = &node->member[i];
                            if((selectbits & (1<<pElem->pos)) != 0)
                            {// only disable the children of the
                                // interested bits
                                _disableRecNode(pElem->child);
                            }
                        }
                    }
#endif
            }
}
void _disableRecNode(Node *node){
    int i, mVal;
    // reading the register first to only change the relevant bits
// "0" as mask
    mVal = DEVREAD(node->mAddr);
    DEVWRITE(node->mAddr, mVal&(~(_getNodeBitMask(node))));
// implementaion depending search type
#if MASK_CHILDREN
    if (node->member->child != NULL){
    // this is based on assumption that there is no hybrid nodes
        for (i=0; i<node->numOfMember; i++)
        {
            //get down to the leaf nodes
            _disableRecNode(node->member[i].child);
        }
    }
#endif
}
```

The exemplary code illustrated in Table 4 is based on the container object and element object structures illustrated by the code in Table 1-B. In another embodiment, the above example code could be modified to use the container object and element object structures illustrated by the code in Tables 1-A or Table 2.

The abstraction management subsystem 670 may be further configured to maintain parameters associated with the status indicators. One such parameter may be a unique name associated with a particular status indicator. Another parameter may be a Boolean flag to indicate some condition or state. Yet another parameter may be a position of the status indicator within a register of the hierarchical register consolidation structure 620. Of course, however, other parameters that can be associated with a status indicator are well within the scope of the present invention. In another embodiment, the abstraction management subsystem 670 is further configured to clear or set the status indicators in the hierarchical register consolidation structure 620. See Table 5 for exemplary code for clearing one or more status indicators.

TABLE 5

Clearing Alarms

```
void clearElemAlarm(Elem *elem){
    int addr, pos;
    if (elem->child != NULL)
    {
        // Only leaf nodes have alarms to clear,
        // go down to leaf
        _clearRecNodeAlarm(elem->child,);
    }else{
        addr = elem->container->aAddr;
        pos = elem->pos;
        // W1C to the bit position
        DEVWRITE(addr, 1<<pos);
    }
}
void clearNodeAlarm(Node *node, int selectbits){
    int i;
    Elem *pElem;
    if (node->member->child == NULL)
    {
        // the passed in node is a leaf, this is based on
        // assumption that there are no hybrid nodes
        // W1C to the node for only the specified bit locations
        DEVWRITE(node->aAddr, (selectbits &
            _getNodeBitMask(node)));
    }else
    {
        // Only leaf nodes have alarms to clear,
        // go down to the leaf
        for (i=0; i<node->numOfMember; i++)
        {
            pElem = &node->member[i];
            if ((selectbits & (1<<pElem->pos)) != 0)
            {
                _clearRecNodeAlarm(pElem->child);
            }
        }
    }
}
void _clearRecNodeAlarm(Node *node){
    if (node->member->child == NULL){
        // this is based on assumption that there are
        // no hybrid nodes
        // W1C to the node for only the specified
        // bit locations
        DEVWRITE(node->aAddr, _getNodeBitMask(node));
    }else{
        // Only leaf nodes have alarms to clear,
        // go down to the leaf
        for (int i=0; i<node->numOfMember; i++){
            _clearRecNodeAlarm(node->member[i].child);
        }
    }
}
```

The exemplary code illustrated in Table 5 is based on the container object and element object structures illustrated by the code in Table 1-B. In another embodiment, the above example code could be modified to use the container object and element object structures illustrated by the code in Tables 1-A or Table 2.

In addition, the abstraction management subsystem 670 may be further configured to create or destroy the condition management structure 650. In one embodiment, the abstraction management subsystem 670 may create the condition management structure 650 by dynamically allocating the condition management structure's container objects and elements in heap memory. Also, the abstraction management subsystem 670 may destroy the condition management structure 650 by deallocating the condition management structure's container objects and elements from heap memory. In an alternative embodiment, the abstraction management subsystem 670 reallocates the condition management structure 650 by resetting pointers. For example, if the condition management structure 650 is allocated in an array of container objects and an array of element objects, the abstraction management subsystem 670 may reset the pointers in the container object array and the element object array to the beginning of the arrays, effectively destroying the condition management structure 650.

Although the condition management system 640 includes separate discussions of the abstraction retrieval subsystem 660 and the abstraction management subsystem 670, other embodiments of the present invention may combine portions of or all of the abstraction retrieval subsystem 660 and the abstraction management subsystem 670 together. In another embodiment, the condition management system 640 may be embodied within another computer system and/or software, or within the processor 610. In addition, the condition management system 640 and the condition management structure 650 advantageously allow for the development and use of uniform application software interfaces, which would reduce development and maintenance efforts.

Figure 7:
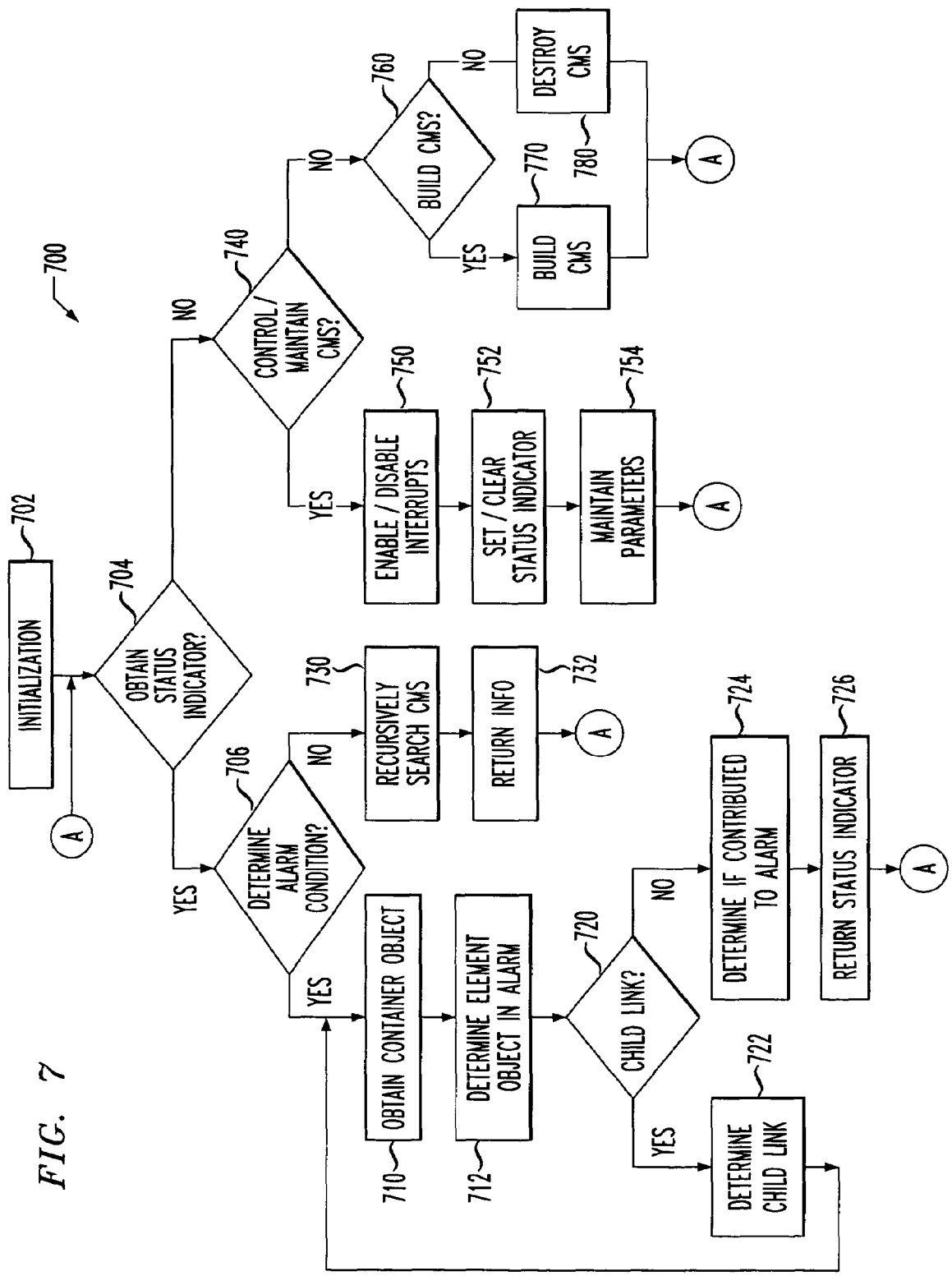
FIG. 7 illustrates a flow diagram of an embodiment of a method of operating a condition management system conducted according to the principles of the present invention.

Turning now to FIG. 7, illustrated is a flow diagram of an embodiment of a method, generally designated 700, of operating a condition management system conducted according to the principles of the present invention. In FIG. 7, the method 700 first performs initialization in a step 702.

After initialization, the method 700 determines if it is to obtain a condition of a status indicator in a decisional step 704. If the method 700 is to obtain a condition of a status indicator, the method 700 then determines if it is to determine which status indicator is in alarm condition in a decisional step 706. If the method is to determine which status indicator is in an alarm condition, the method 700 then employs a condition management structure to obtain the root container object in a step 710. Next, the method 700 determines the element object that represents a status indicator that is in an alarm condition. See FIGS. 2 and 6 for a discussion on determining which element object, associated with a container object, represents a status indicator in an alarm condition.

The method 700 then determines if the element object found in the step 712 has a child link established in a decisional step 720. If the child link is established, the element object is not associated with a leaf container object and the method 700 then determines the child link in a step 722. Next, the method 700 continues traversing down the condition management structure by obtaining the container object specified in the child link in the step 710. If the child link is not established, the element object found in the step 712 is associated with a leaf container object. The method 700 then determines if the status indicator represented by the element object found in the step 712 contributed to the alarm in a step 724. The method 700, in one embodiment, may employ a mask register to determine if the mask for the status indicator is disabled (not masked). If the mask for the status indicator is disabled, then the status indicator contributed to the alarm. The method 700 then returns the condition of the status indicator in a step 726. The method 700 may also return a unique name associated with the status indicator. If the status indicator is masked, then the method 700, in a related embodiment, may return to determine another element object that represents a status indicator that is also in the alarm condition in the step 712. (Not shown) The method 700 then returns to determine the type of processing to be performed in the decisional step 704.

If the method 700 determined that it was not to find a status indicator in an alarm condition in the decision step 706, the method 700 then performs a query for a status indicator. The method 700 performs a query by recursively searching each container object and its associated element objects in the condition management structure in a step 730. See Table 3 for an example of code that recursively traverses the condition management structure. Once the method 700 finds the desired query information, the method 700 returns the status indicator and/or any other associated information specified in the query in a step 732. The method 700 then returns to determine the type of processing to be performed in the decisional step 704.

If the method 700 determined that is not to obtain a condition of a status indicator in the decisional step 704, the method 700 determines if it is to control propagation and/or maintain the condition management structure in a decisional step 740. If the method 700 is to control propagation and/or maintain the condition management structure, the method 700 may then employ the condition management structure to enable/disable interrupts for selected ones of the status indicators in the hierarchical register consolidation structure in a step 750. Next, the method 700 may clear or set the status indicators in a step 752. The method 700 may also maintain parameters in the condition management structure that are associated with the status indicators in a step 754. The method 700 may perform any of the steps 750, 752, 754 and in any order depending upon what is required. Also the method 700 may employ recursive queries to find and modify the desired information and/or status indicators. The method 700 then returns to determine the type of processing to be performed in the decisional step 704.

If the method 700 determined that it was not to control propagation or maintain the condition management structure in the decisional step 740, the method then determines if the condition management structure is to be built in the decisional step 760. If the condition management structure is to be built, the method 700 builds the condition management structure according to the principles of the present invention in a step 770. The method 700 then returns to determine the type of processing to be performed in the decisional step 704. If the method 700 determined that it was not to build the condition management structure in the decisional step 760, the method 700 would then destroy the condition management structure in a step 780. The method 700 then returns to determine the type of processing to be performed in the decisional step 704.

One skilled in the art should know that the present invention is not limited to processing the types of information described above. Nor is the present invention limited to the exact decisional tests described above. Other embodiments of the present invention may employ different tests to determine what is to be performed and/or the order of execution. The present invention and method may also perform multiple functions at the same time. Also, other embodiments of the present invention may have additional or fewer steps than described above.

While the methods disclosed herein have been described and shown with reference to particular steps performed in a particular order, it will be understood that these steps may be combined, subdivided, or reordered to form an equivalent method without departing from the teachings of the present invention. Accordingly, unless specifically indicated herein, the order and/or the grouping of the steps are not limitations of the present invention.

Although the present invention has been described in detail, those skilled in the art should understand that they can make various changes, substitutions and alterations herein without departing from the spirit and scope of the invention in its broadest form.

What is claimed is:

1. A condition management system embodied in a computer-readable media of a processor employing a hierarchical register consolidation structure, comprising:
   a condition management data structure, separate from said hierarchical register consolidation structure, configured to abstract groups of status indicators associated with said hierarchical register consolidation structure into a tree of hierarchical container objects and element objects, each of said container objects associated with at least one of said element objects and linked to a single parent object, each of said element objects configured to represent at least one of said status indicators and linked to a single child object, wherein if two groups of said status indicators consolidate to a single consolidation status indicator of said hierarchical register consolidation structure, one of said container objects being associated with said at least one of said element objects and a virtual element object, said virtual element object being said parent object to one of said container objects associated with said element objects representing said status indicators of one of said two groups;
   an abstraction retrieval subsystem configured to employ said condition management structure to traverse said hierarchical register consolidation structure to determine a condition of at least one of said status indicators; and
   an abstraction management subsystem configured to employ said condition management structure to control a propagation of selected ones of said status indicators through said hierarchical register consolidation structure.

2. The condition management system as recited in claim 1 wherein each of said container objects includes said at least one of said element objects.

3. The condition management system as recited in claim 1 wherein said condition management structure is dynamically allocated within the hardware associated with said processor.

4. The condition management system as recited in claim 1 wherein said condition management structure is preallocated within the hardware associated with said processor.

5. The condition management system as recited in claim 1 wherein said status indicators are bits of registers within said hierarchical register consolidation structure.

6. The condition management system as recited in claim 1 wherein said hierarchical register consolidation structure is a hierarchical interrupt register structure of said processor.

7. The condition management system as recited in claim 6 wherein each of said status indicators represents an interrupt bit in an interrupt register of said hierarchical interrupt register structure.

8. The condition management system as recited in claim 7 wherein said abstraction management subsystem is further configured to set/clear or enable/disable interrupts for said interrupt bit.

9. The condition management system as recited in claim 1 wherein said parent object is a consolidation element object associated with a hierarchically higher container object and said child object is a hierarchically lower container object.

10. The condition management system as recited in claim 9 wherein said consolidation element object represents the consolidation of all of said element objects associated with said child object.

11. The condition management system as recited in claim 1 wherein said abstraction management subsystem is further configured to set/clear said status indicators or maintain associated parameters for one or more of said status indicators.

12. The condition management system as recited in claim 1 wherein said abstraction management subsystem is further configured to create or destroy said condition management structure.

13. The condition management system as recited in claim 1 wherein said container objects include addresses to registers of said hierarchical register consolidation structure, said abstraction retrieval subsystem and said abstraction management subsystem further configured to employ said addresses in accessing said hierarchical register consolidation structure.

14. The condition management system as recited in claim 1 wherein said abstraction retrieval subsystem is further configured to employ a mask to determine said condition of said at least one of said status indicators represented by ones of said element objects associated with a leaf container object.

15. A method of operating a condition management system for use with a processor employing a hierarchical register consolidation structure, comprising:
   employing a condition management data structure, separate from said hierarchical register consolidation structure, to abstract groups of status indicators associated with said hierarchical register consolidation structure into a tree of hierarchical container objects and element objects, each of said container objects associated with at least one of said element objects and linked to a single parent object, each of said element objects configured to represent at least one of said status indicators and linked to a single child object, wherein if two groups of said status indicators consolidate to a single consolidation status indicator of said hierarchical register consolidation structure, one of said container objects being associated with said at least one of said element objects and a virtual element object, said virtual element object being said parent object to one of said container objects associated with said element objects representing said status indicators of one of said two groups;
   employing said condition management structure to traverse said hierarchical register consolidation structure to determine a condition of at least one of said status indicators; and
   employing said condition management structure to control a propagation of selected ones of said status indicators through said hierarchical register consolidation structure.

16. The method as recited in claim 15 wherein each of said container objects includes said at least one of said element objects.

17. The method as recited in claim 15 further comprising dynamically allocating said condition management structure within the hardware associated with said processor.

18. The method as recited in claim 15 further comprising pre-allocating said condition management structure within the hardware associated with said processor.

19. The method as recited in claim 15 wherein said status indicators are bits of registers within said hierarchical register consolidation structure.

20. The method as recited in claim 15 wherein said hierarchical register consolidation structure is a hierarchical interrupt register structure of said processor.

21. The method as recited in claim 20 wherein each of said status indicators represents an interrupt bit in an interrupt register of said hierarchical interrupt register structure.

22. The method as recited in claim 21 further comprising setting/clearing or enabling/disabling interrupts for said interrupt bit.

23. The method as recited in claim 15 wherein said parent object is a consolidation element object associated with a hierarchically higher container object and said child object is a hierarchically lower container object.

24. The method as recited in claim 23 wherein said consolidation element object represents the consolidation of all of said element objects associated with said child object.

25. The method as recited in claim 15 further comprising setting/clearing said status indicators or maintaining parameters for one or more of said status indicators.

26. The method as recited in claim 15 further comprising creating or destroying said condition management structure.

27. The method as recited in claim 15 wherein said container objects include addresses to registers of said hierarchical register consolidation structure, said method further comprising employing said addresses in accessing said hierarchical register consolidation structure.

28. The method as recited in claim 15 wherein said employing said condition management structure to traverse includes employing a mask to determine said condition of said at least one of said status indicators represented by ones of said element objects associated with a leaf container object.

29. A memory for storing status indicators to control a propagation of selected ones of said status indicators through a hierarchical register consolidation structure, comprising:
a condition management data structure stored in said memory, separate from said hierarchical register consolidation structure, said condition management data structure including information to abstract groups of status indicators associated with a hierarchical register consolidation structure of said processor into a tree and accessed by said application program, said condition management data structure including:
hierarchical container objects and element objects stored in said memory, each of said container objects being associated with at least one of said element objects and having a parent link to a single parent object, wherein if two groups of said status indicators consolidate to a single consolidation status indicator of said hierarchical register consolidation structure, one of said container objects being associated with said at least one of said element objects and a virtual element object, said virtual element object being said parent object to one of said container objects associated with said element objects representing said status indicators of one of said two groups;
each of said element objects representing at least one of said status indicators and having a child link to a single child object; and
said parent object being a consolidation element object associated with a hierarchically higher container object and said child object being a hierarchically lower container object, thereby establishing a hierarchy of said container objects.

30. The memory as recited in claim 29 wherein a single one of said element objects being said parent object to one of said container objects associated with said element objects representing a group of said status indicators if said group of status indicators consolidate to a plurality of consolidation status indicators of said hierarchical register consolidation structure, remaining ones of said plurality of said consolidation status indicators not being represented in said condition management data structure.

31. The memory as recited in claim 29 wherein a first portion of one group of said status indicators being represented by a first set of said element objects associated with one of said container objects and a second portion of said one group of said status indicators being represented by a second set of said element objects associated with a virtual container object if said first and second portions of said one group of said status indicators consolidate to different consolidation status indicators of said hierarchical register consolidation structure, said virtual container object having a virtual parent link to a different parent object than said parent link of said one of said container objects.

32. The memory as recited in claim 29 wherein each of said container objects includes said at least one of said element objects.

33. The memory as recited in claim 29 wherein only one of said container objects is a root container object, said root container object being associated with a hierarchically highest group of said status indicators of said hierarchical register consolidation structure and being a starting point for accessing said condition management data structure, said root container object further having said parent link to said parent object being unestablished.

34. The memory as recited in claim 33 wherein ones of said container objects are leaf container objects, each of said leaf container objects being associated with a hierarchically lowest group of said status indicators, each of said elements objects associated with said leaf container objects having said child link to said child object being unestablished.

35. The memory as recited in claim 29 wherein each of said element objects include a container link to its associated one of said container objects.

36. The memory as recited in claim 29 wherein each of said element objects include a unique name and a position of said at least one of said status indicators within a register of said hierarchical register consolidation structure that is associated with said at least one of said status indicators.

37. The memory as recited in claim 29 wherein each of said container objects include an address of a register of said hierarchical register consolidation structure selected from the group consisting of:
a status register address;
a mask register address;
a persistency register address; and
an alarm register address.

38. The memory as recited in claim 29 wherein said status indicators are bits of registers within said hierarchical register consolidation structure.

39. The memory as recited in claim 29 wherein said hierarchical register consolidation structure is a hierarchical interrupt register structure of said processor.

40. The memory as recited in claim 39 wherein each of said status indicators represents an interrupt bit in an interrupt register of said hierarchical interrupt register structure.

41. The memory as recited in claim 29 wherein said consolidation element object represents the consolidation of all of said element objects associated with said child object.

* * * * *